(12) United States Patent
Zhang et al.

(10) Patent No.: US 10,560,523 B1
(45) Date of Patent: Feb. 11, 2020

(54) CONVERTING AND SYNCHRONIZING SYSTEM TIMES

(71) Applicant: EMC IP Holding Company LLC, Hopkinton, MA (US)

(72) Inventors: Minjie Zhang, Shanghai (CN); Joshua D. Hutt, Raleigh, NC (US); Yiming Bao, Shanghai (CN); Zhen Zhang, Shanghai (CN); Fei Dong, Shanghai (CN); Peiyu Zhuang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 14/749,794

(22) Filed: Jun. 25, 2015

(51) Int. Cl.
*G06F 15/16* (2006.01)
*H04L 29/08* (2006.01)
(52) U.S. Cl.
CPC .................. *H04L 67/1095* (2013.01)
(58) Field of Classification Search
CPC .................................................. H04L 67/1095
USPC ........ 709/248, 217, 203, 224, 201; 370/231, 370/516, 252, 503
See application file for complete search history.

(56) References Cited

U.S. PATENT DOCUMENTS

| | | | | |
|---|---|---|---|---|
| 7,242,669 B2* | 7/2007 | Bundy | .................. | G06Q 40/00 370/252 |
| 7,634,579 B1* | 12/2009 | Kalbarga | ...................... | 709/248 |
| 2006/0173952 A1* | 8/2006 | Coyle | ................... | H04J 3/0667 709/203 |
| 2010/0118721 A1* | 5/2010 | Sakurada | .............. | H04J 3/0664 370/252 |
| 2015/0032801 A1* | 1/2015 | Hart | ........................ | H04W 4/18 709/203 |
| 2015/0106645 A1* | 4/2015 | Breuer | ...................... | G06F 1/12 713/400 |
| 2016/0286510 A1* | 9/2016 | Soulhi | ..................... | H04L 63/10 |

OTHER PUBLICATIONS

Software product release, ESA 2.4 (EMC Storage Analytics), Oct. 10, 2014.

* cited by examiner

*Primary Examiner* — Thuong Nguyen
(74) *Attorney, Agent, or Firm* — Muirhead and Saturnelli, LLC (57) ABSTRACT

Described are techniques for synchronizing system times. A request is sent from a first system to a second system to obtain a current remote system time. A first time value denotes a time when the request is sent. A response, including the current remote system time, is received from the second system. A second time value denotes a time when the response is received by the first system. An average of the first time value and the second time value is determined A difference between the current remote system time and the average is determined. It is determined whether the difference is more than an endurance value. Responsive to determining the difference is more than the endurance value, the difference is used to convert a remote system time of the second system to an equivalent local system time of the first system.

20 Claims, 5 Drawing Sheets

CONVERTING AND SYNCHRONIZING SYSTEM TIMES

BACKGROUND

Technical Field

This application generally relates to synchronization of times from different systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method synchronizing system times comprising: sending, from a first system to a second system, a request to obtain a current remote system time of the second system; recording, at the first system, a first time value T1 denoting a time at which the request is sent from the first system to the second system; receiving, at the first system, a response from the second system, the response including the current remote system time of the second system, wherein a second time value T2 denotes a time at which the response is received by the first system; determining an average of the first time value T1 and the second time value T2; determining a first difference between the current remote system time and the average; determining whether the first difference is more than an endurance value; and responsive to determining the first difference is more than the endurance value, using the first difference to convert a remote system time of the second system to an equivalent local system time of the first system. The first system may maintain a first system time denoting a current system time of the first system and the second system may maintain a second system time denoting a current system time of the second system. Responsive to determining the first difference is more than the endurance value, it may be determined that the first system time and the second system time are not synchronized. Responsive to determining the first difference is not more than the endurance value, it may be determined that the first system time and the second system time are synchronized. The method may include, responsive to determining the first difference is not more than the endurance value, using a time difference of zero when converting a remote system time of the second system to an equivalent local system time of the first system. The method may include periodically obtaining, by the first system from the second system, information regarding event occurrences on the second system. The information may include a plurality of event objects each describing one of the event occurrences on the second system. Each of the plurality of event objects may include a property denoting a recorded event time at which one of the event occurrences occurred on the second system. Responsive to determining the first difference is more than the endurance value, the first difference may be added to the recorded event time to convert the recorded event time, based on the remote system time of the second system, to a second event time, based on the local system time of the first system. The endurance value may specify a threshold amount of time. The endurance value may denote any of deviation and stability with respect to any of network latency of a network connecting the first system and the second system, and request processing or service time of the second system. The endurance value may be expressed in terms of one or more standard deviations of any of observed network latency values and service or processing times of commands on the second system. Each of the first system and the second system may be any of an appliance, a computer system, and a data storage system. The first difference may be determined by subtracting the current remote system time from the average. Responsive to determining the first difference is more than the endurance value, the first difference may be used to convert a local system time of the first system to an equivalent remote system time of the second system. The first time value T1, the second time value T2, and the current remote system time may be timestamps each denoting a date and time.

In accordance with another aspect of the invention is a system comprising: a first system with a first processor and a first memory; a second system with a second processor and a second memory; and wherein the first memory comprises code stored thereon, that when executed, performs a method of synchronizing system times comprising: sending, from the first system to the second system, a request to obtain a current remote system time of the second system; recording, at the first system, a first time value T1 denoting a time at which the request is sent from the first system to the second system; receiving, at the first system, a response from the second system, the response including the current remote system time of the second system, wherein a second time value T2 denotes a time at which the response is received by the first system; determining an average of the first time value T1 and the second time value T2; determining a first difference between the current remote system time and the average; determining whether the first difference is more than an endurance value; and responsive to determining the first difference is more than the endurance value, using the first difference to convert a remote system time of the second system to an equivalent local system time of the first system.

In accordance with another aspect of the invention is a computer readable medium comprising code stored thereon that, when executed, performs a method of synchronizing system times comprising: sending, from a first system to a second system, a request to obtain a current remote system time of the second system; recording, at the first system, a first time value T1 denoting a time at which the request is sent from the first system to the second system; receiving, at the first system, a response from the second system, the response including the current remote system time of the second system, wherein a second time value T2 denotes a time at which the response is received by the first system; determining an average of the first time value T1 and the second time value T2; determining a first difference between the current remote system time and the average; determining whether the first difference is more than an endurance value; and responsive to determining the first difference is more than the endurance value, using the first difference to convert a remote system time of the second system to an equivalent local system time of the first system. The first system may maintain a first system time denoting a current system time of the first system and the second system may maintain a second system time denoting a current system time of the second system. Responsive to determining the first difference is more than the endurance value, it may be determined that the first system time and the second system time are not synchronized. Responsive to determining the first difference is not more than the endurance value, it may be determined that the first system time and the second system time are synchronized.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
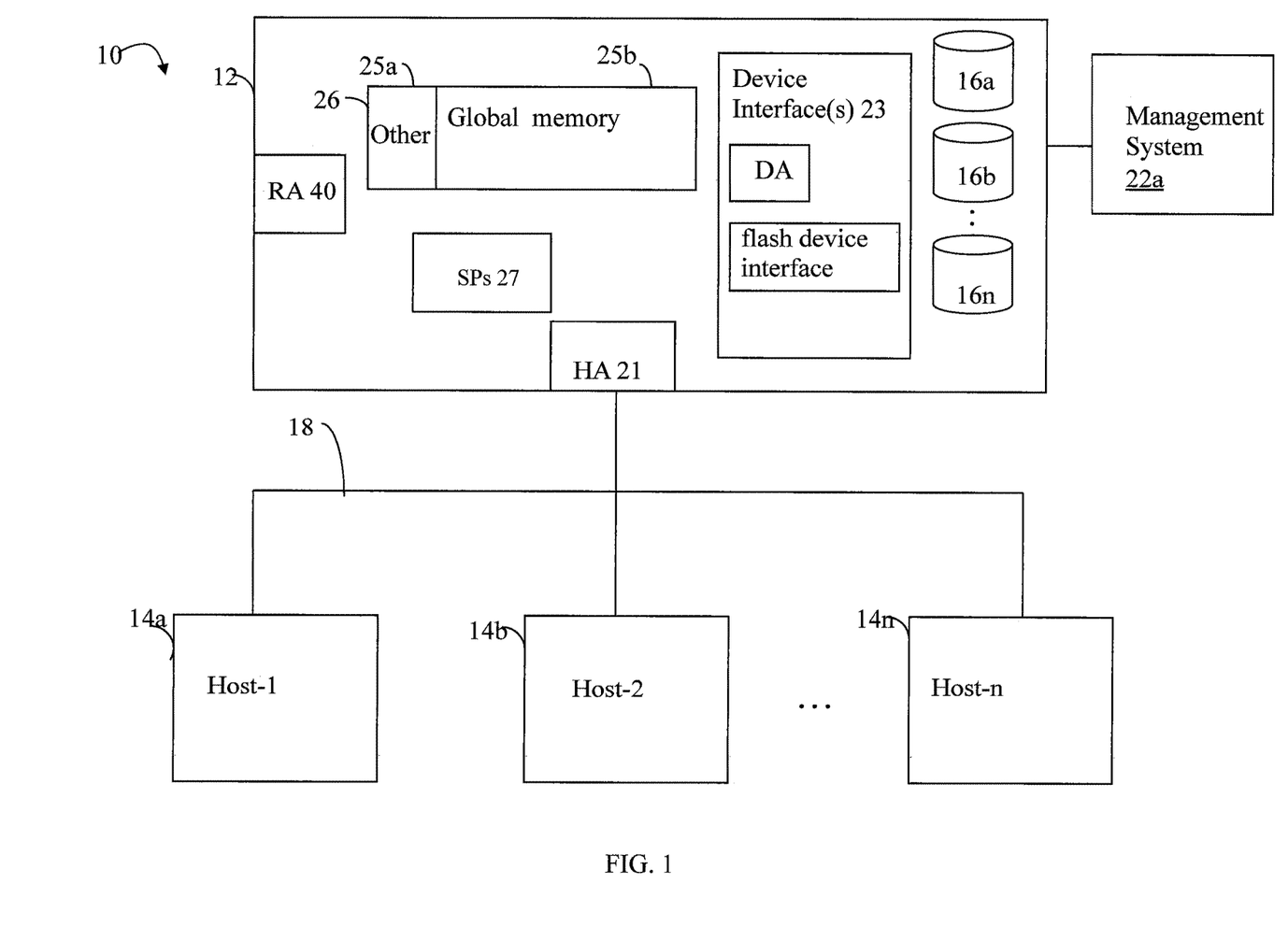
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

A data storage system, or more generally, any computer system or other component may maintain a system date and/or time. The system date and/or time may have a particular format referred to herein as a timestamp encoding a current date and/or time. The timestamp may include, for example, the current month, day of the month, year, and a time expressed in hours, minutes, and seconds. A time stamp on a particular system may also include smaller time units at the subsecond level. The particular format may vary with system and embodiment.

A timestamp denoting a particular point in time may be used to mark occurrence of certain system events. Each such event may generally denote an occurrence of an activity, particular state of a system or component, and the like. The particular events reported and/or tracked may vary with the particular system. Upon the occurrence of an event, a system may take steps to track or record information about the event occurrence. Information about such recorded events may be analyzed and used for any desired purpose. For example, one embodiment in accordance with techniques herein where the system is a data storage system provides for the data storage system generating an event object or record for each data storage system event occurrence of interest. Each event object may include information regarding the event occurrence expressed as one or more properties of the event object. One such event object property recorded may a timestamp denoting the system time at which the event occurrence took place. On a data storage system, an event may relate to a particular operation or activity performed (e.g., new physical storage device added, new logical device having storage provisioned), a state change in a physical storage device, component of the data storage system, and the like. For example, an event occurrence of a disk drive failure may result in generating an event object characterizing the event. The event object may include properties that, for example, identify the particular disk drive, denote the state of the drive (e.g., last operation performed, error code, and the like), and a timestamp denoting the date and time at which the drive failure occurred.

In such an embodiment, an application, such as EMC® Storage Analytics, may execute on a computer system, appliance, and the like, and retrieve information from the data storage system regarding the event occurrences. The application may process and analyze recorded event information, for example, to provide various statistics or analytics regarding the data storage system.

Figure 2:
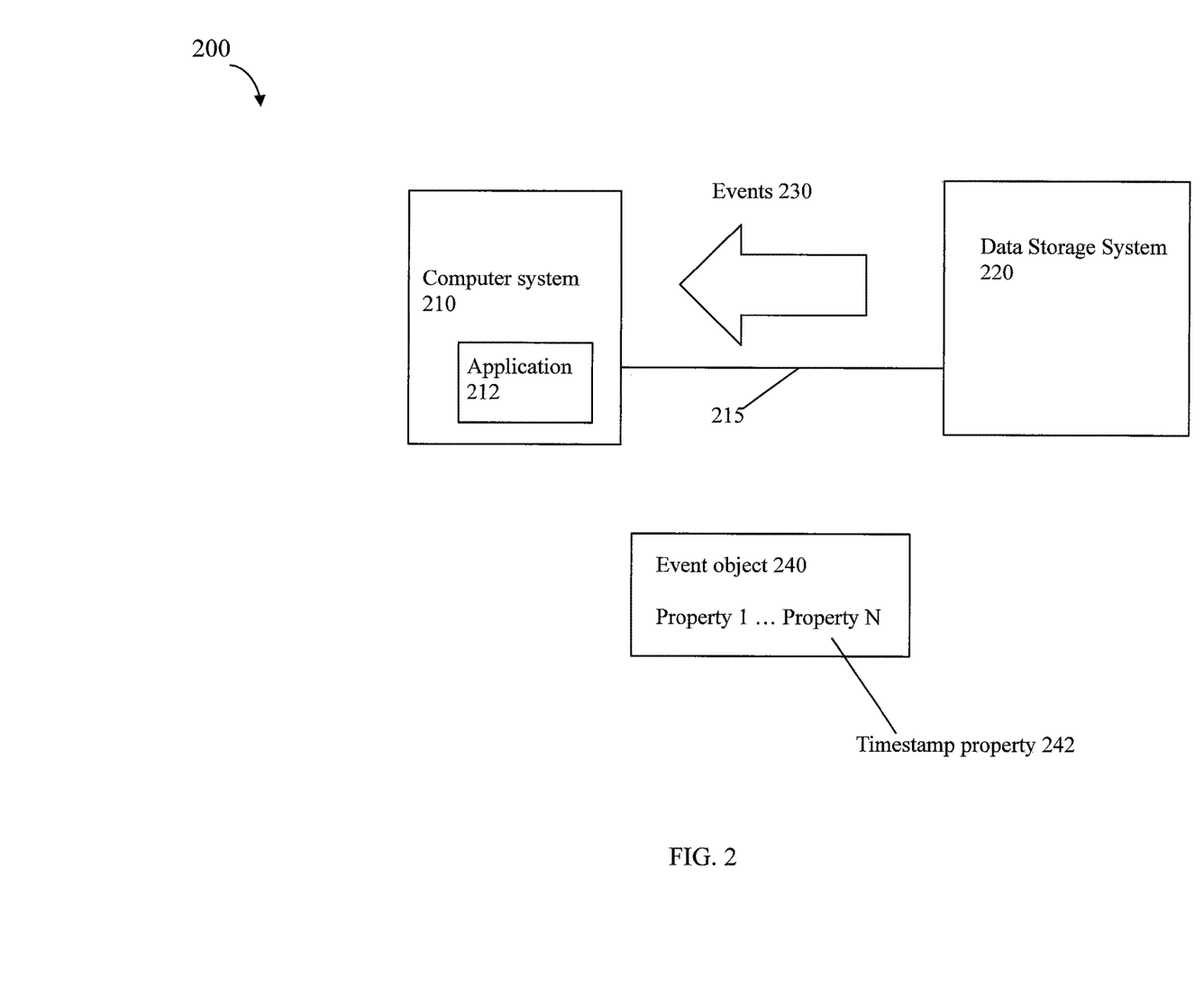
FIG. 2 is an example illustrating collection of event objects in an embodiment in accordance with techniques herein.

Referring to FIG. 2, shown is an example 200 illustrating components in an embodiment in accordance with techniques herein. The example 200 includes a computer system 210 and data storage system 220. The computer system 210 may include software executing thereon, such as an application 212 like EMC® Storage Analytics (ESA) described above. It should be noted that the system 210 is illustrated as a computer system and system 220 is illustrated as a data storage system. However more generally, element 210 and 220 may represent any suitable systems using techniques herein. For example, the ESA application 212 may execute on a virtual appliance or other server system.

The data storage system 220 may be as described above in connection with FIG. 1 where each event occurrence on the data storage system 220 may be recorded as an event object 240. Consistent with description above, the event object 240 may include one or more N properties characterizing the recorded event occurrence. In an embodiment in accordance with techniques herein, one of the N object properties may be a timestamp property 242 denoting the date and/or time at which the event occurrence took place as recorded on the data storage system 220. Upon the occurrence of the event, the data storage system 220 may generate an event object 240 where the timestamp property 242 is the recorded system time of the data storage system 220 at which the event occurred.

At various points in time, the application 212 may collect 230 event information from the data storage system 220. For example, in one embodiment where the application 212 is the ESA application as described above, the application 212 may retrieve event object information at each occurrence of a fixed time period, such as every 5 minutes. The event objects collected for a time period may denote all events that have occurred during this particular 5 minute interval since the previous time period of event data collection. The computer system 210 and data storage system 220 may be connected to one another over a network 215, such as the internet. The application 212 may request and retrieve from the data storage system 220 the event objects each time period occurrence over the connection 215.

In connection with techniques herein, processing may be performed to convert the time stamp (or more generally time of an event occurrence) of each event object. The stamp indicates the event occurrence time based on a first system time of the data storage system 220 which may converted using techniques herein to a second time stamp on the computer system 210. The second time stamp may be based on another second system time as maintained on the computer system 210. Generally, at a particular point in time, both the computer system 210 and the data storage system 220 may have an associated system time as maintained on each respective system 210, 220. For example, at a first point in time, an event E1 may occur on the data storage system 220 where a first timestamp TS1 may be recorded on the data storage system 220 based on the current system time ST1 of 220 denoting the first point in time. At the same first point in time, the computer system 210 also has a current system time ST2. For the same point in time, the system time ST1 of the data storage system 220 may or may not be synchronized with the system time ST2 of the computer system 210. For example, it may be that the system times maintained by systems 210 and 220 are not synchronized and may therefore always differ by an amount of time.

Described in following paragraphs are techniques that may be used to synchronize such possibly different system times, such as ST1 and ST2. Such techniques may be used, for example, to convert a first timestamp, such as ST1 denoting a point in time of an event occurrence as recorded on the data storage system 220, to a second timestamp, such as ST2 denoting also denoting the same point in time of the event occurrence but expressed in terms of the system time as maintained by the computer system 210. For example, assume the system time as maintained by the data storage system 220 is about 2.3 seconds less than the system time as maintained by the computer system 210. The application 212 retrieving the event objects and associated timestamps is unaware of the actual system time difference of 2.3 seconds as noted above. Techniques in following paragraphs may be performed to synchronize or convert a received timestamp based on the data storage system 220's system time to an equivalent timestamp which includes this additional 2.3 seconds. Such techniques provide for determining whether the systems 210 and 220 have approximately synchronized system times. Such techniques also provide an estimate to use for any such time difference between the systems 210 and 220 so that a timestamp of an event object as recorded on the data storage system 220 (based on system 220's system time) may be converted to an equivalent synchronized timestamp for use on the computer system 210 (where the synchronized timestamp is based on system 210's system time).

It should be noted that in embodiments using techniques herein, the system time of the data storage system 220 may be changed or reset between event collection periods. For example, event objects collected for a first time period may have associated timestamps based on the data storage system's time which may be approximately synchronized with the system time as maintained on the computer system 210. The data storage system 220 may then be rebooted or otherwise have its system time reset where the reset system time may not be approximately synchronized with the system time as maintained on the computer system 210. In this case, techniques herein may be performed which account for the possible reset or change in the system time as maintained by the data storage system 220 whereby the particular system time difference, if any, between systems 210 and 220 may vary with event object collection time periods since the system time of the data storage system 220 may be reset.

As another consideration in an embodiment in accordance with techniques herein, the amount of time which a request and response spend on the network is unknown. The foregoing contributes to difficulty in estimating any system time difference. Thus, an embodiment in accordance with techniques herein attempts to minimize the influence of this unknown network time as described in more detail below.

Figure 3:
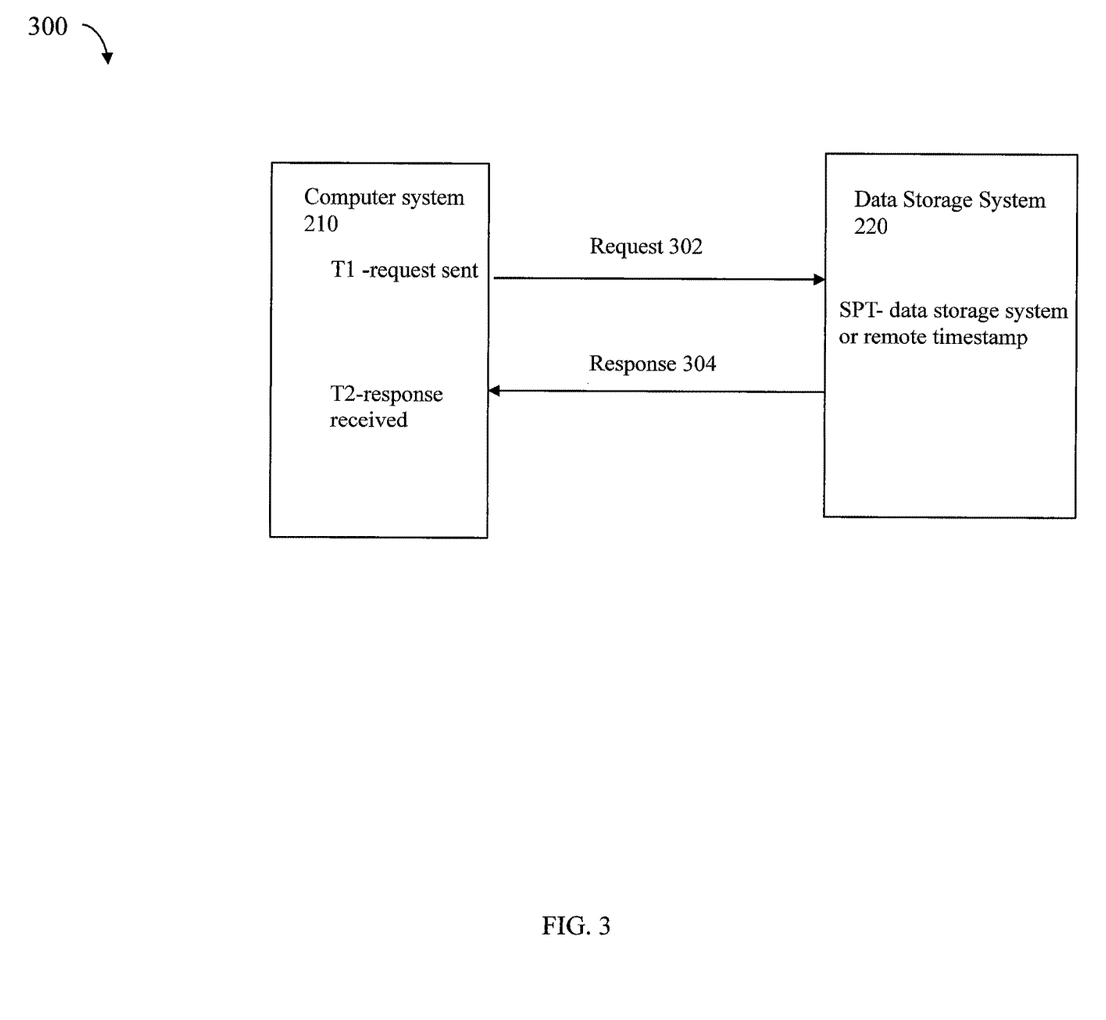
FIG. 3 is an example illustrating various recorded times/ timestamps and a request and a response exchanged between systems in an embodiment in accordance with techniques herein.

With reference to FIG. 3, shown is an example 300 illustrating use of techniques herein between systems. The example 300 includes the computer system 210 and data storage system 220 as in FIG. 2. The computer system 210, which may also be referred to as the local or controlling system performing techniques herein, maintains a first system time (which may also be referred to as the local system time). The data storage system 220, which may also be referred to as the remote system, maintains a second system time (which may also be referred to as the remote system time). In following paragraphs, reference may be made to generally obtaining and recording times. Consistent with description elsewhere herein, each such time may be expressed in terms of a timestamp encoding date and time information.

In accordance with techniques herein, processing may be performed to send request 302 from the system 210 to the system 220. The request 302 may be a request to retrieve the current remote system time SPT from the data storage system 220. For example, the request 302 may include a get time command which requests that the system 220 read its current system time and return it to the system 210 in response 304. As a first step, techniques herein may record the local time stamp T1 on the computer system 210 just prior to sending the request 302. As a second step, the request 302 may be sent from the computer system 210 to the data storage system 220. As a third step, on the data storage system 220, the request 302 for the remote system current system time, SPT, is received and processed. As a fourth step, in response to receiving the request 302, the data storage system 220 sends response 304 including SPT. As a fifth step, the response 304 is received by the computer system 210 which processes the received response 304. Such processing of the fifth step may include the computer system 210 recording a local timestamp T2 denoting the time at which the response 304 was received by system 210. As a sixth step, the computer system 210 may perform processing to calculate the average of T1 and T2 whereby Tave may denote the foregoing average which may be more formally expressed as:

$$Tave=(T1+T2)/2 \qquad \text{EQUATION 1}$$

It should be noted that the foregoing calculation of Tave is one way in which techniques herein minimize the influence of the network. Tave is used in following steps described below based on the assumption that, since generally the same network is used to transmit both the request 302 and response 304, the average of such values, Tave, may be used to approximate the time when the request 302 arrives at the data storage system 220 and also when SPT is retrieved in the data storage system 220. To further illustrate, NT1 may denote the amount of time it takes the request 302 to be transmitted from system 210 to system 220, and NT2 may denote the amount of time it takes the response 304 to be transmitted from system 220 to the system 210. Based on the foregoing assumption, NT1 should be approximately the same as NT2 as represented by using Tave of EQUATION 1.

As a seventh step, processing may be performed on the computer system 210 to calculate delta T, also denoted as ΔT, which is the difference between T and SPT. The foregoing may be more formally expressed as:

$$\Delta T = Tave - SPT \qquad \text{EQUATION 2}$$

where

Tave-SPT denotes the difference between Tave and SPT.

As an eighth step, processing may be performed on the computer system 210 to compare ΔT (as determined using EQUATION 2) to an endurance value. Generally, an endurance value may be a threshold amount of time used to determine whether any detected system time differences between local computer system 210 and remote data storage system 220 are negligible whereby the foregoing two systems may be determined to have synchronized system times (or more generally system times that are determined to be approximately synchronized system times). For example, in one embodiment, an endurance value of 10 seconds may be used.

Generally, if ΔT, the difference between Tave and SPT (as determined using EQUATION 2) is less than the specified endurance value, the time difference between local and remote system times (e.g., between 210 and 220) may be characterized as negligible whereby the local and remote system times may be considered as approximately synchronized. In this case, Tave denotes the approximate local time on system 210 at which the remote time SPT is obtained.

Otherwise, if ΔT, the difference between Tave and SPT, is NOT less than the specified endurance value, any time difference between the local and remote system times as expressed by ΔT may denote an actual system time synchronization difference. In this latter case, the ΔT as determined using EQUATION 2 may be added to a timestamp of an event as acquired from the data storage system 220. The foregoing ΔT may be added to convert or synchronize a first timestamp of data storage system 220 (where the first timestamp denotes a first point in time at which an event occurred based on system time as maintained by system 220) to an equivalent second timestamp of computer system 210 (where the second time stamp also denotes the same first point in time but where the second timestamp is an equivalent timestamp based on local system time as maintained by 210 rather than the remote system time as maintained on 220).

It should be noted that, more generally, ΔT (as determined using EQUATION 2) may be used to convert a first timestamp from system 220 to an equivalent timestamp of system 210 as described above by adding ΔT to the first timestamp. Additionally, ΔT (as determined using EQUATION 2) may also be used to convert a second timestamp from system 210 to an equivalent timestamp of system 220 by subtracting ΔT from the first timestamp. Thus, ΔT of EQUATION 2 may generally be used to convert timestamps between the local system 210 and remote system 220.

In one embodiment, as described above, techniques herein may performed to determine new ΔT each event collection time period, such as every 5 minutes, since the assumption is that system times on the local and/or remote systems may be changed during any collection time period. As an alternative, techniques herein may also be used in an embodiment having a different assumption where, for example, system times on the local and/or remote system may only be subject to change at particular specified times. In such a case, techniques herein may be performed to generally determine a new ΔT only at such particular specified times when local and/or remote system times may possibly be modified.

In one aspect, the endurance value that is a threshold amount of time may denote a deviation in observed times (e.g., T2) such as may be caused by any variation over time in stability of the network and/or data storage system. The endurance value may denote a deviation or variation tolerance as may be expected with the network and/or remote data storage system 220. An embodiment may specify an endurance value using any suitable technique that may vary with embodiment. Following is one example illustrating how an embodiment in accordance with techniques herein may determine an endurance value reflecting variation or stability of both the network and also the remote system.

First, processing may be performed to determine a first value denoting the network variation, deviation and stability. For example, an embodiment may determine an endurance value by issuing a first series of pings from the local to the remote system. As known in the art, a ping test involves the local system, such as computer system 210, sending a message to the remote system, such as data storage system 220 whereby the remote system sends a response back to the local system. The local system then notes the time at which the response is received. The foregoing ping test may be used to determine whether the local system communicate with the remote system over the network. Then, if network communication is established, ping tests also determine the connection latency or network delay between the two systems. The time delay from when the local system sent the ping request to when it receives a response is a time measurement, also referred to herein as round trip network latency value, that indicates how long it takes a "packet" of data to travel from the local system to the remote system and then back to the remote system. Based on the series of pings, the local system may determine a round trip network latency value for each ping message and then determine the standard deviation with respect to all observed round trip network latency values for the ping tests.

The standard deviation $S_N$, as known in the art, may be defined as follows:

$$S_N = \sqrt{\frac{1}{N}\sum_{i=1}^{N}(x_i - \bar{x})^2}, \qquad \text{EQUATION 3}$$

where

N is the number of ping tests;

$\{X_1, X_2, X_3 \ldots X_N\}$ are the observed round trip network latency values for the ping tests; and $\bar{x}$ is the mean value of these observations.

As also known in the art, the standard deviation is the square root of the variance which is the average of the squared deviation about the sample mean.

An embodiment may also perform processing to determine a second value denoting the remote system variation, deviation and stability. For example, the local system may also issue a second series of requests to the remote system where each request results in the remote system remotely executing a command and then returning a response denoting an amount of time (also referred to as service time or remote system processing time) it took the remote system to perform processing to complete the requested command. For the second series of requests, the standard deviation may be determined for the observed service times or remote system processing times. The foregoing standard deviation may denote the deviation in service time or remote system processing time.

An embodiment may use the foregoing to determine a first standard deviation value V1 with respect to the observed round trip network latency values and a second standard deviation value V2 with respect to the observed service times or remote system processing times. V1 may denote an amount of time for one standard deviation with respect to the observed round trip network latency values and V2 may denote an amount of time for one standard deviation with respect to the observed remote system service times or remote system processing times. An embodiment may sum or add V1 and V2 to denote a single aggregate standard deviation with respect to both network latency and remote system processing deviation and then select an endurance value that is, for example, more than twice the aggregated standard deviation value. For example, the series of ping tests may determine standard deviation of V1=5 seconds and a standard deviation of V2=3 seconds denoting a single standard deviation in remote system service or processing time. The single aggregated standard deviation may be 8 seconds (e.g., 5+3) and an embodiment may generally select an endurance value that is at least two aggregated standard deviations, or more than 16 seconds. Thus, the foregoing may be used to estimate a standard deviation or variation with respect to network stability or variation in combination with remote system stability or variation. The foregoing provides one way in which a customized endurance value may be provided that may vary with the particular network and data storage system (e.g., vary with the particular data storage system and environment).

As another alternative, an embodiment may choose to base the endurance value on either V1 or V2 alone rather than the combination of V1 and V2 For example, an embodiment may determine an endurance value that is more than twice V1 (e.g., more than 10 seconds), or an endurance value that is more than twice V2 (e.g. more than 6 seconds).

It should be noted that the particular value above of two standard deviations for determining the endurance value are merely illustrative and embodiment may consider any number of standard deviations when determining the endurance value (e.g., more than 1 standard deviation, more than 2.5 standard deviations, more than 3 or 4 standard deviations, and the like). Additionally, it should be noted that an embodiment may use standard deviation or any other suitable metric, such as variance, to denote the variation or stability of the network and/or remote data storage system.

As another alternative, an embodiment may select the endurance value based on experience and know-how of those skilled in the art. For example, an endurance value may be specified as a default static value by an experienced vendor or data storage system manufacturer where the default value may be based on general experience and data collected in connection with many customers in data storage system environments.

As yet another alternative, the endurance value may be selected based on a time level of significance or deviation significance of the user. For example, a user may only be concerned with deviations of more 1 minute or more and accordingly select the endurance value to be 1 minute.

What will now be described are flowcharts summarizing processing as set forth above that may be performed in an embodiment in accordance with techniques herein.

Figure 4:
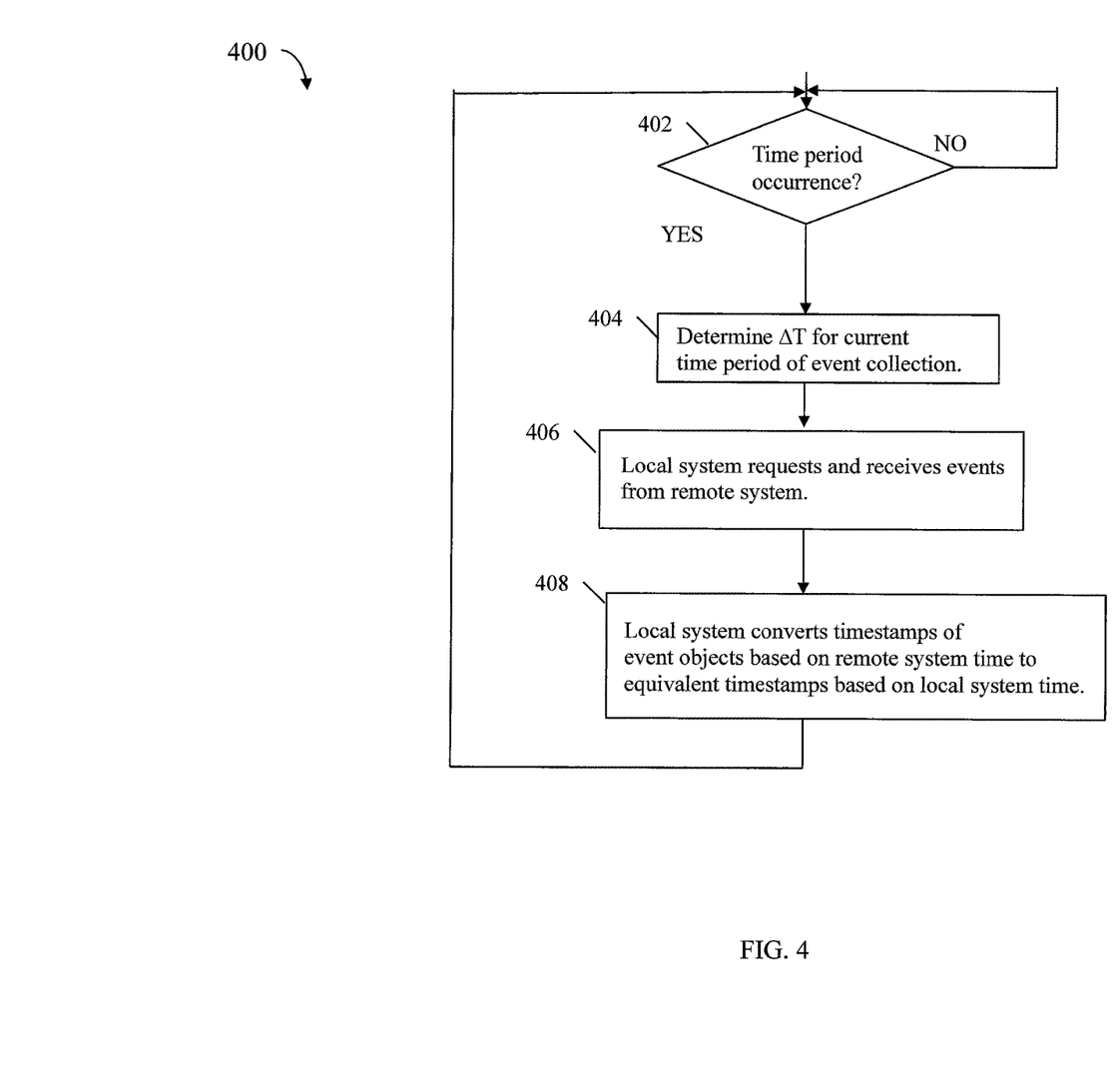
FIGS. 4 and 5 are flowcharts of processing steps that may be performed in an embodiment in accordance with techniques herein.

Referring to FIG. 4, shown is a first flowchart 400 of processing steps that may be performed in an embodiment in accordance with techniques herein. The steps of FIG. 4 may be performed, for example, by the local system, such as computer system 210 of FIG. 3. At step 402, a determination is made as to whether a next time period has occurred for performing event collection. As described above, event collection may be performed periodically, such as at each occurrence of a fixed interval such as every 5 minutes. Control remains at step 402 until step 402 evaluates to yes or true. If step 402 evaluates to yes, control proceeds to step 404 where a $\Delta T$ may be determined for the current time period of event collection. As noted above, the $\Delta T$, denoting the time difference between local and remote system times, may possibly change with each event collection time period in this particular embodiment. Thus, step 404 may be repeated for each time period of event collection. Step 404 denotes processing as described herein and is further summarized in connection with FIG. 5 described below. At step 406, the local system requests and received the next set of events from the remote system. At step 408, the local system performs processing, as needed, to convert timestamps of event objects (e.g., just received in step 406) where such timestamps are based on the remote system time, to equivalent timestamps based on the local system time. Step 408 may include adding $\Delta T$ as determined in step 404 to each remote system timestamp of an event object to obtain its equivalent local system timestamp based on local system time. From step 408, control proceeds to step 402.

Figure 5:
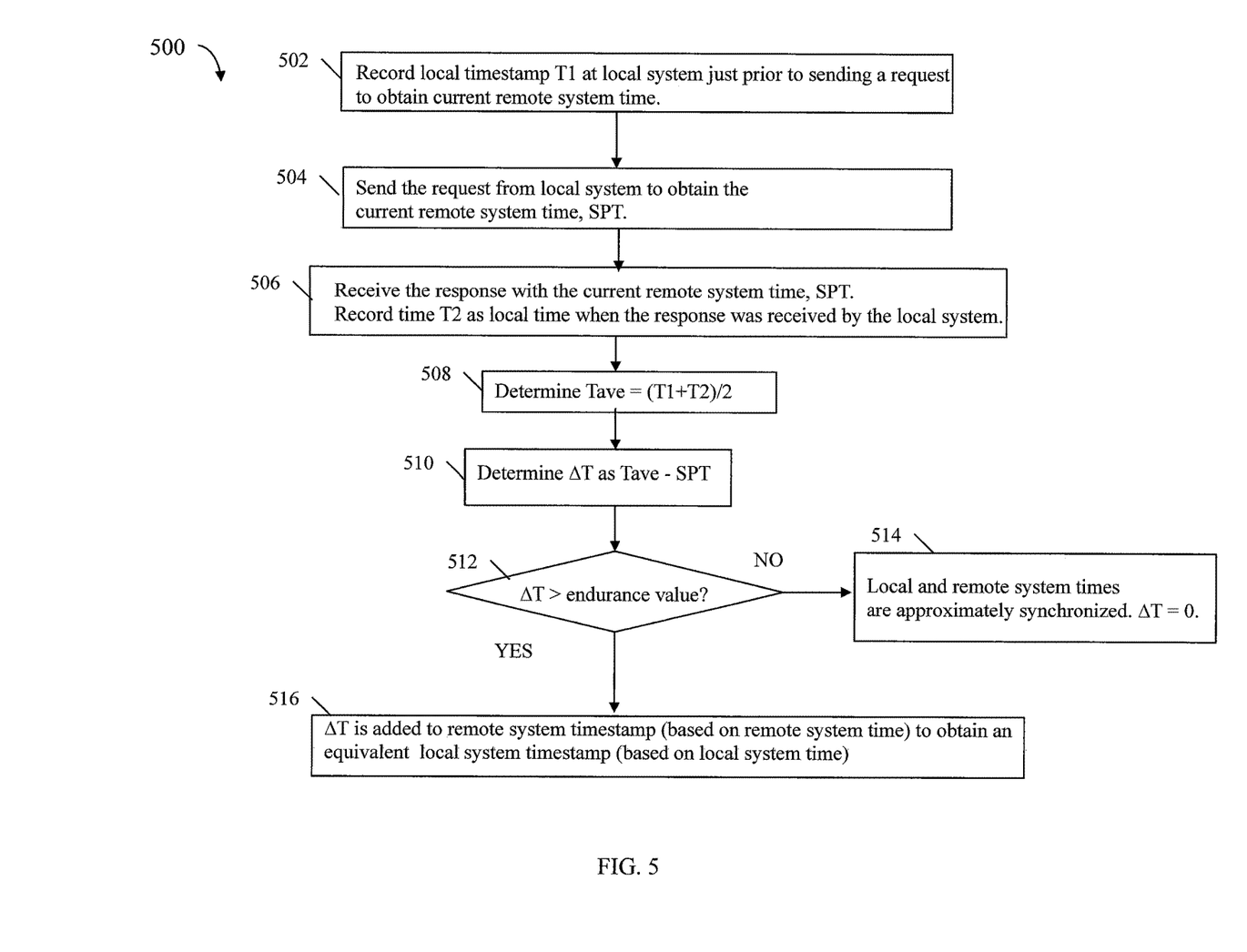

Referring to FIG. 5, shown is a second flowchart 500 of processing steps that may be performed in an embodiment in accordance with techniques herein. The steps of FIG. 5 may be performed, for example, by the local system, such as computer system 210 of FIG. 3. Flowchart 500 provides additional detail of how $\Delta T$ may be calculated in an embodiment in accordance with techniques herein. At step 502, local timestamp T1 is recorded at the local system just prior to sending out a request to the remote system to obtain the current remote system time. At step 504, the request is sent from the local to the remote system to obtain the current remote system time, SPT. At step 506, a response is received by the local system from the remote system where the response includes the request SPT. Step 506 includes the local system recording the local time when the response was received by the local system. At step 508, the local system may determine Tave=(T1+T2)/2, as expressed using EQUATION 1 above. At step 510, the local system may determine $\Delta T$ as Tave−SPT, as expressed using EQUATION 2 above. At step 512, a determination is made as to whether $\Delta T$ is greater than a specified endurance value. If step 512 evaluates no, control proceeds to step 514 where a determination as made that the local and remote system times are approximately synchronized and a value of $\Delta T=0$ is used. If step 512 evaluates to yes, control proceeds to step 516 where it is determined that the local and remote system times are not synchronized. In step 516, $\Delta T$ as determined in step 510 is used to convert or synchronize local and remote system times. In this example, $\Delta T$ as determined in step 510 may be added to a remote system timestamp (based on remote system time) to obtain an equivalent local system timestamp (based on local system time).

As described herein, such techniques may be generally applied for use with time conversions between any two systems. For example, the first and second systems may be any of a storage appliance, computer system, data storage system, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of synchronizing system times comprising:
    sending, using a processor and from a first system to a second system, a request to obtain a current remote system time of the second system;
    recording, at the first system and using a processor, a first time value T1 denoting a time at which the request is sent from the first system to the second system;
    receiving, at the first system and using a processor, a response from the second system, the response including the current remote system time of the second system, wherein a second time value T2 denotes a time at which the response is received by the first system;

determining, using a processor, an average that is a mathematical average of the first time value T1, denoting the time at which the request for the current remote system time is sent from the first system to the second system, and the second time value T2, denoting the time at which the response, that includes the current remote system time and that is sent by the second system, is received by the first system, wherein the average is used as an approximate value for the current remote system time of the second system;

determining, using a processor, a first difference that is a mathematical difference between the average, denoting the approximate value for the current remote time of the second system, and the current remote system time included in the response;

determining, using a processor, whether system times of the first system and the second system are synchronized by determining whether the first difference is more than an endurance value denoting a threshold time variation allowed;

responsive to determining the first difference is more than the endurance value wherein the system times of the first system and the second system are not synchronized, performing processing using a processor, the processing comprising:
synchronizing a remote system time of the second system with an equivalent local system time of the first system by adding the first difference to the remote system time of the second system to determine the equivalent local system time of the first system; and responsive to determining the first difference is not more than the endurance value, determining synchronization of system times of the first system and the second system is not needed, and wherein the method further includes performing other processing to determine the endurance value comprising:
sending a plurality of command requests from the first system to the second system, wherein each of the plurality of command requests result in the second system executing a requested command,
in response to each of the plurality of commands received at the second system, returning a corresponding response from the second system to the first system, said corresponding response including an amount of time the second system takes to complete servicing said each command; and
determining the endurance value using one or more values including a first value denoting a deviation in the amount of time the second system takes to complete servicing the plurality of commands.

2. The method of claim 1, wherein the first system maintains a first system time denoting a current system time of the first system and the second system maintains a second system time denoting a current system time of the second system.

3. The method of claim 1, further comprising:
responsive to determining the first difference is not more than the endurance value, using a time difference of zero when converting the remote system time of the second system to the equivalent local system time of the first system.

4. The method of claim 1, further comprising:
periodically obtaining, by the first system from the second system, information regarding event occurrences on the second system.

5. The method of claim 4, wherein the information includes a plurality of event objects each describing one of the event occurrences on the second system.

6. The method of claim 5, wherein each of the plurality of event objects includes a property denoting a recorded event time at which one of the event occurrences occurred on the second system.

7. The method of claim 6, wherein, responsive to determining the first difference is more than the endurance value, the first difference is added to the recorded event time to convert the recorded event time, based on the remote system time of the second system, to a second event time, based on the local system time of the first system.

8. The method of claim 7, wherein the endurance value denotes any of deviation and stability with respect to any of: network latency of a network connecting the first system and the second system, and request processing or service time of the second system.

9. The method of claim 8, wherein the endurance value is expressed in terms of one or more standard deviations of any of observed network latency values and service or processing times of commands on the second system.

10. The method of claim 1, wherein each of the first system and the second system is any of an appliance, a computer system, and a data storage system.

11. The method of claim 1, wherein the first difference is determined by subtracting the current remote system time from the average.

12. The method of claim 1, further comprising:
responsive to determining the first difference is more than the endurance value, using the first difference to convert a local system time of the first system to an equivalent remote system time of the second system.

13. The method of claim 1, wherein the first time value T1, the second time value T2, and the current remote system time are timestamps each denoting a date and time.

14. The method of claim 1, wherein the one or more values used to determine the endurance value include a second value denoting a deviation in observed network latency of a network connecting the first system and the second system, wherein the request and response are sent over the network.

15. The method of claim 14, wherein the endurance value is determined as a mathematical sum of the first value, denoting a deviation in the amount of time the second system takes to complete servicing the plurality of commands, and the second value, denoting a deviation in observed network latency of the network over which the request and response are sent.

16. The method of claim 1, wherein the average used as the approximate value for the current remote system time of the second system is determined by first processing including:
determining a sum by adding the first time value T1 and the second time value T2; and
determining the average as one half of the sum.

17. The method of claim 1, wherein the responsive to determining the first difference is more than the endurance value, performing, using a processor, additional processing comprising:
synchronizing a local system time of the first system with an equivalent remote system time of the second system by subtracting the first difference from the local system time of the first system to determine the equivalent remote system time of the second system.

18. A system comprising:
a first system with a first processor and a first memory;

a second system with a second processor and a second memory; and wherein the first memory comprises code stored thereon, that when executed, performs a method of synchronizing system times comprising:
  sending, using a processor and from a first system to a second system, a request to obtain a current remote system time of the second system;
  recording, at the first system and using a processor, a first time value T1 denoting a time at which the request is sent from the first system to the second system;
  receiving, at the first system and using a processor, a response from the second system, the response including the current remote system time of the second system, wherein a second time value T2 denotes a time at which the response is received by the first system;
  determining, using a processor, an average that is a mathematical average of the first time value T1, denoting the time at which the request for the current remote system time is sent from the first system to the second system, and the second time value T2, denoting the time at which the response, that includes the current remote system time and that is sent by the second system, is received by the first system, wherein the average is used as an approximate value for the current remote system time of the second system;
  determining, using a processor, a first difference that is a mathematical difference between the average, denoting the approximate value for the current remote time of the second system, and the current remote system time included in the response;
  determining, using a processor, whether system times of the first system and the second system are synchronized by determining whether the first difference is more than an endurance value denoting a threshold time variation allowed;
  responsive to determining the first difference is more than the endurance value wherein the system times of the first system and the second system are not synchronized, performing processing using a processor, the processing comprising:
    synchronizing a remote system time of the second system with an equivalent local system time of the first system by adding the first difference to the remote system time of the second system to determine the equivalent local system time of the first system; and
  responsive to determining the first difference is not more than the endurance value, determining synchronization of system times of the first system and the second system is not needed, and wherein the method further includes performing other processing to determine the endurance value comprising:
  sending a plurality of command requests from the first system to the second system, wherein each of the plurality of command requests result in the second system executing a requested command;
  in response to each of the plurality of commands received at the second system, returning a corresponding response from the second system to the first system, said corresponding response including an amount of time the second system takes to complete servicing said each command; and
  determining the endurance value using one or more values including a first value denoting a deviation in the amount of time the second system takes to complete servicing the plurality of commands.

19. A non-transitory computer readable medium comprising code stored thereon that, when executed, performs a method of synchronizing system times comprising:
  sending, using a processor and from a first system to a second system, a request to obtain a current remote system time of the second system;
  recording, at the first system and using a processor, a first time value T1 denoting a time at which the request is sent from the first system to the second system;
  receiving, at the first system and using a processor, a response from the second system, the response including the current remote system time of the second system, wherein a second time value T2 denotes a time at which the response is received by the first system;
  determining, using a processor, an average that is a mathematical average of the first time value T1, denoting the time at which the request for the current remote system time is sent from the first system to the second system, and the second time value T2, denoting the time at which the response, that includes the current remote system time and that is sent by the second system, is received by the first system, wherein the average is used as an approximate value for the current remote system time of the second system;
  determining, using a processor, a first difference that is a mathematical difference between the average, denoting the approximate value for the current remote time of the second system, and the current remote system time included in the response;
  determining, using a processor, whether system times of the first system and the second system are synchronized by determining whether the first difference is more than an endurance value denoting a threshold time variation allowed;
  responsive to determining the first difference is more than the endurance value wherein the system times of the first system and the second system are not synchronized, performing processing using a processor, the processing comprising:
    synchronizing a remote system time of the second system with an equivalent local system time of the first system by adding the first difference to the remote system time of the second system to determine the equivalent local system time of the first system; and
  responsive to determining the first difference is not more than the endurance value, determining synchronization of system times of the first system and the second system is not needed, and wherein the method further includes performing other processing to determine the endurance value comprising:
  sending a plurality of command requests from the first system to the second system, wherein each of the plurality of command requests result in the second system executing a requested command;
  in response to each of the plurality of commands received at the second system, returning a corresponding response from the second system to the first system, said corresponding response including an amount of time the second system takes to complete servicing said each command; and
  determining the endurance value using one or more values including a first value denoting a deviation in the amount of time the second system takes to complete servicing the plurality of commands.

20. The non-transitory computer readable medium of claim 19, wherein the first system maintains a first system time denoting a current system time of the first system and the second system maintains a second system time denoting a current system time of the second system.

* * * * *